United States Patent Office 3,679,560
Patented July 25, 1972

3,679,560
PROCESS FOR THE PREPARATION OF AN ANHYDRIDE OR TRIVALENT PHOSPHORUS USING EXCITED HELIUM
Eugene J. Mezey, Upper Arlington, Ohio, assignor to The Procter & Gamble Company, Cincinnati, Ohio
No Drawing. Filed Sept. 25, 1969, Ser. No. 861,145
Int. Cl. C01b 25/12
U.S. Cl. 204—157.1 S                    15 Claims

ABSTRACT OF THE DISCLOSURE

A process for preparing an anhydride of trivalent phosphorus from an anhydride of pentavalent phosphorus using electronically-excited helium is disclosed. The anhydride of trivalent phosphorus is useful as an intermediate in the preparation of detergency builders for use in detergent compositions.

FIELD OF THE INVENTION

This invention relates to a process for the preparation of phosphorus compounds. More particularly, this invention relates to a process for the preparation of an anhydride of trivalent phosphorus from an anhydride of pentavalent phosphorus. This invention also relates to a process for the preparation of an anhydride of trivalent phosphorus from an anhydride of pentavalent phosphorus using a heretofore-unknown synthetic technique.

BACKGROUND OF THE INVENTION

Methods for the preparation of the anhydride of trivalent phosphorus, phosphorus trioxide, are not numerous and only recently have methods for preparing phosphorus trioxide on a commercial scale been developed. A known laboratory method of preparing phosphorus trioxide by burning phosphorus in oxygen is described by Wolf and Schmager in Chem. Ber., 62, 771–786 (1929). The yield of phosphorus trioxide obtained by the procedure of Wolf et al., supra, rarely exceeds about 50% and is usually substantially less than that amount. In addition using the procedures described by Wolf et al., by-products consisting largely of $P_4O_{10}$, red phosphorus and the like are formed in large quantities.

Heinz and Thilo (German Democratic Republic Patent No. 26,660) have also reported a method of preparing phosphorus trioxide by reacting phosphorus pentoxide with $N_2O$ but by-products are present in the yields of the desired product.

A method for preparing phosphorus trioxide is also disclosed in the copending application of David D. Whyte, Phillip F. Pflaumer and Thomas S. Roberts, Ser. No. 566,482, filed July 20, 1966, for Process for Preparing Chemical Compounds Containing Trivalent Phosphorus. This process comprises reacting elemental phosphorus, oxygen, and at least one carbon oxide at a temperature in excess of 1500° C. until substantially complete equilibrium is achieved. This process is an improvement in the art of producing trivalent phosphorus compounds over those methods known in the art and the yields of trivalent phosphorus compounds are greater than those previously obtained in the art.

The methods for preparing phosphorus trioxide described above involve typically chemical techniques in which phosphorus trioxide is prepared by burning phosphorus in the presence of oxygen or in which phosphorus trioxide is prepared by reducing phosphorus pentoxide using a chemical reductant.

The copending application of Allen K. Reed, William M. Goldberger, and David D. Whyte, Ser. No. 860,776, filed Sept. 25, 1969, for Process for the Preparation of an Anhydride of Trivalent Phosphorus, filed concurrently herewith, accomplishes the synthesis of phosphorus trioxide using a DC plasma jet, a departure from the known chemical methods of synthesis. This process involves the reaction of an anhydride of pentavalent phosphorus with a reductant such as carbon monoxide in a reaction zone at a temperature of from 1500° K. to about 20,000° K. These temperatures in the reaction zone are achieved using an inert gas plasma flame obtained by discharging a direct current through a stream of argon or helium.

The preparation of compounds in which the phosphorus atom exists in a +3 oxidation state in good yields and in pure form has been rendered difficult, in part, by the complex nature of the phosphorus atom. The phosphorus atom can exist in compounds which in the oxidation state of the phosphorus atom ranges from −3, as in phosphine ($PH_3$), to +5, as in phosphoric acid ($H_3PO_4$), pyrophosphoric acid ($H_4P_2O_7$), phosphate salts ($M_4PO_4$), and metaphosphate salts ($MPO_3$). Compounds in which phosphorus atoms exist in an oxidation state intermediate between −3 and +5 are also known, e.g., phosphorus monoxide ($P_2O$), phosphite salts ($M_3PO_3$), hypophosphoric acid ($H_4P_2O_6$), and the like. Thus, methods of preparing phosphorus compounds having a particular oxidation state intermediate between −3 and +5 are either quite specific, do not result in acceptable yields of the desired product, require high temperatures for synthesis, or are contaminated with by-products due to the ease with which phosphorus compounds in which the phosphorus atom has oxidation states other than the desired intermediate oxidation state can be prepared.

The known approaches to the preparation of compounds in which the phosphorus atom exists in the +3 oxidation state have all used extremely high temperatures to achieve the reaction of elemental phosphorus with oxygen to obtain an anhydride of trivalent phosphorus or the reduction of $P_4O_{10}$ to a lower oxide of phosphorus, e.g., $P_4O_6$. In those instances in which the preparation of an hydride of trivalent phosphorus has been attempted in the art, the heat of reaction necessary for preparing compounds in which phosphorus exists in the +3 oxidation state has been obtained from burning elemental phosphorus in oxygen (as is the case in which elemental phosphorus is reacted with oxygen) or has had to be applied externally (either using a conventional fuel source or using an inert gas plasma flame) to obtain the temperatures required to produce an anhydride of trivalent phosphorus.

Accordingly, it is an object of this invention to prepare an anhydride of trivalent phosphorus using a heretofore-unknown technique unlike the typical chemical syntheses heretofore attempted.

In addition it is an object of this invention to prepare an anhydride of trivalent phosphorus from an anhydride of pentavalent phosphorus at essentially room temperature eliminating the necessity of using equipment compatible with the high temperatures heretofore required in the preparation of the anhydride of trivalent phosphorus.

In addition, it is an object of this invention to prepare an anhydride of trivalent phosphorus in essentially pure form.

Also, it is an object of this invention to convert a known and commonly obtainable anhydride of pentavalent phosphorus into a valuable and useful anhydride of trivalent phosphorus. The anhydride of trivalent phosphorus is a valuable intermediate in the preparation of detergency builders for use in detergent compositions. For example, the anhydride of trivalent phosphorus is used in the preparation of ethane-1-hydroxy-1,1-diphosphonic acid and its salts, which are valuable builders for use in detergent compositions as described by Francis L. Diehl in U.S. Pat. 3,159,581, patented Dec. 1, 1964. In addition the anhydride of trivalent phosphorus is useful in the preparation of phosphorus acid of known utility simply by mixing the anhydride of trivalent phosphorus with water.

Additionally, it is an object of this invention to provide a process for the preparation of an anhydride of trivalent phosphorus from an anhydride of pentavalent phosphorus using electronically-excited helium, in an extremely modern technological approach and a heretofore-unknown process.

SUMMARY OF THE INVENTION

The objects of this invention are achieved according to the process described herein. The process of this invention for preparing an anhydride of trivalent phosphorus comprises subjecting an anhydride of pentavalent phosphorus to a plasma stream of electronically-excited helium in a reaction zone, said plasma stream being characterized as a stream of helium irradiated with electromagnetic energy in the microwave range having a frequency of from 300 megahertz to 100,000 megahertz. The process of this invention allows the reaction products to be obtained rapidly, efficiently and in essentially pure form.

More specifically, the process of this invention for the preparation of an anhydride of trivalent phosphorus comprises subjecting an anhydride of pentavalent phosphorus to a plasma stream of electronically-excited helium whereby the anhydride of pentavalent phosphorus is dissociated into an anhydride of trivalent phosphorus and oxygen. The anhydride of trivalent phosphorus can then be obtained using conventional and well-known separation techniques and subsequently used to prepare useful compounds, as for example, ethane-1-hydroxy-1.1-diphosphonic acid and its salts, as described above.

In the process described herein, an anhydride of trivalent phosphorus is produced. As used herein, the term anhydride of trivalent phosphorus and the term phosphorus trioxide are intended to encompass $P_4O_6$, $P_2O_3$ (historically and conventionally used as the formula for phosphorus trioxide), and $(P_2O_3)_n$. Hereinafter the terms, anhydride of trivalent phosphorus, phosphorus trioxide, $P_2O_3$, and $P_4O_6$ are used interchangeably and designate the oxide of phosphorus in which the phosphorus atom is in a +3 oxidation state. Similarly, the term anhydride of pentavalent phosphorus used to designate the starting material in the process of this invention is intended to encompass both of the following chemical formulae, $P_2O_5$ (historically and conventionally used as the formula for phosphorus pentoxide) and $P_4O_{10}$, as well as mixed oxides of phosphorus, e.g., $P_4O_8$ which contains $P_4O_{10}$, and the designation phosphorus pentoxide. Hereinafter, the terms anhydride of pentavalent phosphorus, phosphorus pentoxide, $P_2O_5$, and $P_4O_{10}$ are used interchangeably and designate the oxide of phosphorus in which the phosphorus atom is in a +5 oxidation state.

DETAILED DESCRIPTION OF THE INVENTION

In the process described above phosphorus trioxide is produced from phosphorus pentoxide by subjecting an anhydride of pentavalent phosphorus to a plasma stream of electronically-excited helium in a reaction zone. The process of this invention for the preparation of an anhydride of trivalent phosphorus from an anhydride of pentavalent phosphorus using electronically-excited helium, He*, can be summarized schematically by the following overall equation:

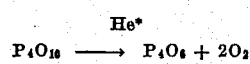

$$P_4O_{10} \xrightarrow{He^*} P_4O_6 + 2O_2$$

The process of this invention involves the dissociation of phosphorus pentoxide, $P_4O_{10}$, using electronically-excited helium into phosphorus trioxide, $P_4O_6$, with the production of oxygen as a by-product.

The anhydride of pentavalent phosphorus used as a starting material in the process is commercially available or can be generated by conventional and well-known techniques. For example, the anhydride of pentavalent phosphorus can be obtained by burning phosphorus in an excess of oxygen. Helium can be obtained commercially and electronically-excited as described hereinafter.

In the process of this invention, phosphorus pentoxide is contacted with electronically-excited helium in a reaction zone. The term reaction zone is used herein to describe the area in which the phosphorus pentoxide is subjected to the plasma stream of electronically-excited helium to produce the anhydride of trivalent phosphorus. Any vessel, chamber or container of any configuration or design is suitable for use as the reaction zone in the process of this invention. All that is necessary for the operation of the process of this invention is that the reaction zone be designed such that the phosphorus pentoxide can be subjected to the plasma stream of electronically-excited helium to produce the phosphorus trioxide product of the process of this invention. One skilled in the art can select a reaction zone of a suitable design and from appropriate materials to accomplish the objects of this invention.

No specific temperature is required in the reaction zone for conducting the process of this invention and the temperature of the reaction zone can range from 0° C. to 500° C., preferably from 0° C. to 100° C. An especially preferred embodiment of the process of this invention is subjecting the phosphorus pentoxide to a plasma stream of electronically-excited helium at just above room temperature, e.g., 30° C. to 50° C.

Any form of phosphorus pentoxide (e.g., solid, liquid or gas) can be used in the process of this invention. At temperatures below the melting point of the phosphorus pentoxide, the phosphorus pentoxide can be in the form of a bed of finely divided solid as in a static bed reactor. The finely divided phosphorus pentoxide also can be contacted with the plasma stream of electronically-excited helium by passing the helium used in forming the plasma stream through the finely divided phosphorus pentoxide to form a fluidized bed and creating the plasma stream within or just above the fluidized bed. Where higher temperatures (e.g., temperatures above the vaporization point of the phosphorus pentoxide) are used, the phosphorus pentoxide vapor can be contacted with the electronically-excited helium plasma stream by passing the phosphorus pentoxide vapor through the plasma stream to accomplish the objects of the process of this invention. Thus, the temperature used in the process of this invention can be a temperature which will be one of choice based on convenience and equipment design rather than on any temperature requirements necessitated by the process of this invention.

An essential part of the process of this invention is the preparation of a plasma stream of electronically-excited helium. The nature of plasma is described in Melvin B. Gottleib, International Science and Technology, pp. 44–50, August 1965; and Ind & Eng. Chem., 55, 16–23, January 1963. The technology of plasma flames and the production of plasma streams are relatively new having been described in the literature only in the past several years. One type of plasma flame which has been used and described in the literature is a dc plasma-jet. A number of articles on generating a plasma flame and on plasma technology are available in which plasma flames are used to achieve chemical syntheses not possible using typically chemical techniques. See Hans W. Leutner and Charles S. Stokes, Industrial and Engineering Chemistry, 53, pp. 341–342 (May 1961); Hans W. Leutner, I&EC Process Design and Development, 1, pp. 166–168 (July 1962); Charles S. Stokes, Chemical Engineering, pp. 191–194, 196, April 1965, Masao Sugawara et al., U.S. Patent 3,192,427, patented June 29, 1965, for Plasma Flame Generator; C. A. Papp, Chemical Engineering Progress, 59, pp. 51–53 (June 1963); Industrial Engineering Chemistry, 55, pp. 16–23 (January 1963); C. S. Stokes and W. W. Knipe, Industrial & Engineering Chemistry, 52, pp. 287–288 (April 1960); and Thomas B. Reed, International Science & Technology, pp. 42–48, 76 (June 1962).

Plasma streams of excited gases can be generated in other ways, as for example, where the gas used to form the plasma stream is subjected to an energy source other than an arc discharge, as for example, initiation of a plasma stream using a source of energy such as spark from a Tesla coil, gamma radiation as from a cobalt 60 cell, or electrons as from a hot tungsten filament and the simultaneous irradiation of the stream with electromagnetic energy in the microwave frequency range. Once initiated the plasma stream is sustained using microwave energy. The plasma stream is an essential part of the process of this invention.

A better understanding of the plasma stream used in the process of this invention can be obtained from the following discussion of the nature of the electronically-excited helium plasma stream. While not desiring to be bound by theory it is believed that the plasma stream exists as a stream of helium which is highly energetic and highly excited. Formation of the energetic and excited helium stream occurs as energy is gained by the gas during plasma formation and simultaneous irradiation with microwave energy. In the case of monatomic elemental gases such as helium it is believed that metastable states of helium atoms are formed in the plasma stream. In addition helium ions and free electrons also having high energies are believed to be present in the plasma stream. These high energy species, e.g., the helium atoms, helium ions and electrons, constituting the electronically excited helium collide with the phosphorus pentoxide molecules and transfer sufficient energy to the phosphorus pentoxide molecules to disrupt and break the phosphorus-oxygen bonds in the phosphorus pentoxide molecules. Lower oxides of phosphorus, such as phosphorus trioxide, and oxygen are formed. The process of this invention is accomplished by the transfer of sufficient energy from these excited species to disrupt the phosphorus-oxygen bonds within the phosphorus pentoxide resulting in the dissociation of the phosphorus pentoxide into phosphorus trioxide.

The plasma stream of electronically-excited helium used in the process of this invention to break the phosphorus-oxygen bonds in the phosphorus pentoxide is sustained by passing electromagnetic energy in the microwave frequency range through a stream of helium gas. The electromagnetic energy in the microwave range suitable for use in the process of this invention can be generated with commercially available equipment and can range in frequency from 300 megahertz to 100,000 megahertz, preferably from 1000 megahertz to 5000 megahertz. Commercially available equipment such as magnetron or a klystron can be used for production of the microwave energy. In these commercially available systems microwave energy is produced and conducted through waveguides or coaxial cable to an area of gas plasma formation. In the process of this invention the microwave energy is used to irradiate a stream of helium gas to form a stream of electronically-excited helium atoms. Magnetrons can be used to generate microwave energy over the frequency range of 300 to 10,000 megahertz, and klystrons can be used to generate microwave energy having frequencies up to 100,000 megahertz. The frequency range of 1,000 megahertz to 5,000 megahertz is preferred because the higher the frequency the smaller the waveguides resulting in smaller reaction zones with less capacity. Suitable microwave energy generators have power ratings ranging from less than 100 watts to greater than 30,000 watts. The specific microwave frequency and the power used are not critical so long as a helium plasma stream comprising electronically-excited helium is generated and sustained in the reaction zone to supply the energy necessary to cause the formation of phosphorus trioxide from phosphorus pentoxide.

The process of this invention is generally operated at reduced pressures, e.g., a pressure in the reaction zone of below 1 atmosphere. It is preferred that less than one atmosphere of pressure be used, e.g., from 0.001 to 0.1 atmosphere, to facilitate generating and sustaining the helium plasma stream for use in the process of this invention. A preferred pressure range is from 0.01 to 0.05 atmosphere. The pressure in the reaction zone which will be necessary to accomplish the objects of this invention will be that pressure which allows a sustained plasma stream of electronically-excited helium to be used in converting the phosphorus pentoxide into phosphorus trioxide. One skilled in the art can select suitable pressures at which the equipment can be operated in order to obtain a stable plasma stream of electronically-excited helium.

The time necessary for the process of this invention whereby phosphorus pentoxide is converted into phosphorus trioxide by being contacted with the electronically-excited helium plasma stream is generally very short. The time necessary to achieve the conversion of phosphorus pentoxide into phosphorus trioxide in general is a residence time in the reaction zone of from about 0.5 millisecond to 5 milliseconds, more normally from about 1 millisecond to about 3 milliseconds.

The determination of the optimum conditions for operation of the process of this invention for a specific set of reaction conditions, e.g., temperature, reactant feed rate, helium flow rate, is within the skill of one knowledgeable in the art and can be simply accomplished by analysis of the reaction products obtained, for example, by sampling the effluent gas stream from the reaction zone and analyzing for the amount of oxygen present. Generally, the stream of helium can be fed into the reaction zone at from 0.5 to 10, preferably from 1 to 5, millimoles per minute per square foot of reaction zone cross sectional area. The relative amounts of helium and phosphorus pentoxide can be varied greatly since attaining the objects of this invention are not dependent upon the stoichiometric requirements between the amount of helium used and the amount of phosphorus pentoxide used but upon the amount of energy passed by the helium plasma stream. Adjustments in the above helium flow rates can be made to obtain the objects of the process of this invention by analyzing for the amount of phosphorus trioxide obtained. For example, where the yield of phosphorus trioxide is low, a longer reaction time can be used to permit greater incidence of contact between the electronically-excited helium stream and the phosphorus pentoxide.

In order to obtain the advantages of the process of this invention, all that is necessary is for the phosphorus pentoxide to be contacted with the plasma stream of electronically-excited helium. Separation of the phosphorus trioxide from unreacted phosphorus pentoxide and the helium and oxygen can be accomplished by conventional and well-known techniques. For example, the oxygen can be removed physically, e.g., with a vacuum pump or by the reaction of the oxygen with an oxygen acceptor or "trap," i.e., reaction of the oxygen with carbon monoxide or hot copper. In one embodiment the oxygen is removed by pumping off the oxygen and collecting the phosphorus trioxide. Where the effluent gases from the reaction zone are at temperatures at which the phosphorus trioxide product is in the vapor state, the effluent gas from the reaction zone can be cooled, the phosphorus trioxide allowed to condense, and the oxygen then removed. It is not desirable for the phosphorus trioxide to remain in contact with oxygen for an extended period, especially at higher temperatures since oxidation of the phosphorus trioxide can occur. However, phosphorus trioxide is sufficiently stable in the presence of oxygen that any number of conventional separation techniques can be used to obtain the phosphorus trioxide in essentially pure form and separation techniques requiring up to about several hours can be used where desired.

It is preferred in the process of this invention that the oxygen formed in the dissociation of the phosphorus pentoxide to form phosphorus trioxide be removed as soon as possible to obtain good yields of phosphorus trioxide and to minimize oxidation of the phosphorus trioxide to phosphorus pentoxide by the oxygen present. Phosphorus pentoxide present in the effluent gas stream, whether the result of unreacted starting material or whether the result of the oxidation of some of the phosphorus trioxide formed, can be recycled where desired to improve the economics of the process. The helium used in the formation of the plasma stream can be recovered from the reaction products and recycled where desired.

In a second embodiment of the process of this invention, the effluent stream from the reaction zone containing phosphorus trioxide and oxygen is contacted with an oxygen acceptor, such as carbon monoxide or hot copper, to remove any oxygen formed in the reaction zone. Other oxygen acceptors can also be employed in the process of this invention where desired. The oxygen acceptor can be present in the reaction zone or downstream from the reaction zone. In an especially preferred embodiment, the helium plasma stream is passed into the reaction zone at a temperature of from 20° C. to 30° C. and containing both elemental phosphorus and phosphorus pentoxide. The phosphorus pentoxide is converted to phosphorus trioxide and the oxygen formed as a by-product is used to oxidize the elemental phosphorus present to phosphorus trioxide. Use of elemental phosphorus as an oxygen acceptor results in even greater yields of phosphorus trioxide.

Other oxygen acceptors can also be used in the process of this invention where desired. Any material which will react with the oxygen formed in the dissociation of the phosphorus pentoxide and yet not interact with the phosphorus trioxide formed can be used. Examples of suitable oxygen acceptors are elemental carbon, elemental phosphorus as hereinbefore mentioned, and carbon monoxide. Where an oxygen acceptor is used to remove the oxygen formed from the phosphorus trioxide formed, the oxygen acceptor generally should be present in the correct stoichiometric ratio to the amount of oxygen formed for each molecule of $P_4O_{10}$ dissociated. Where, for example, carbon monoxide is used as the oxygen acceptor, two moles of carbon monoxide generally are used for each mole of oxygen formed (e.g., for each mole of phosphorus pentoxide dissociated two moles of oxygen are formed). Where elemental phosphorus is used as the oxygen acceptor, one mole of elemental phosphorus is used for each three moles of oxygen formed in the dissociation of phosphorus pentoxide. Depending upon the oxygen acceptor used one skilled in the art can select the appropriate molar ratio of the oxygen acceptor used to remove the oxygen formed in the dissociation of phosphorus pentoxide. Other oxygen acceptors other than those specifically described hereinbefore can be selected based on the criteria given above without departing from the spirit and scope of this invention.

The phosphorus trioxide produced in the process of this invention is generally produced in exceptionally pure form, e.g., from 95% to 99% pure. The product of the process of this invention, phosphorus trioxide, is valuable as an intermediate in the preparation of known builders for use in detergent compositions. For example, ethane-1-hydroxy-1,1-diphosphonic acid, and the salts thereof, can be prepared from the phosphorus trioxide obtainable from the process of this invention.

One method of preparing ethane-1-hydroxy-1,1-diphosphonic acid is described hereinafter. The phosphorus trioxide obtainable from the process of this invention is vaporized (if the reaction zone is operated at a temperature at which the phosphorus trioxide exists as a vapor, the gas from the reaction zone can be used) and passed through a chamber in which the phosphorus trioxide vapor is sprayed with acetic acid. Preparing ethane-1-hydroxy-1,1-diphosphonic acid from a gas stream containing phosphorus trioxide vapor using an acetic acid spray is described by David D. Whyte, Phillip F. Pflaumer, and Thomas S. Roberts, in a copending application, Ser. No. 566,482, filed July 20, 1966, for Process for Preparing Chemical Compounds Containing Trivalent Phosphorus. In the disclosure described therein vaporous trivalent phosphorus anhydrides are recovered from a gas stream by passing the gas stream through a quench chamber. The phosphorus trioxide is removed from the effluent gas in the quench chamber using a conventional packed tower containing acetic acid. The feed rates of acetic acid and the anhydride of trivalent phosphorus as a gas are so controlled that the fluids used in the packet tower contains the desired molar proportions of acetic acid to anhydride of trivalent phosphorus to prepare ethane-1-hydroxy-1,1-diphosphonic acid, e.g., from 0.75:1 to 50:1.

The major proportion of the reaction product between the acetic acid and the anhydride of trivalent phosphorus, $P_4O_6$, is ethane-1-hydroxy-1,1-diphosphonic acid, or condensates thereof, which can be readily converted to the free acid. The reaction of acetic acid with the anhydride of trivalent phosphorus results in the production of a substantial proportion of precursors of ethane - 1 - hydroxy-1,1-diphosphonic acid, such as acetylated phosphite compounds. A digestion step is used to convert these precursors to ethane-1-hydroxy-1,1-diphosphonic acid. In the digestion step the acetic acid/anhydride of trivalent phosphorus mixture is maintained at a temperature of from about 70° C. to about 170° C. for from 1 minute to 4 hours. The digested reaction product is then hydrolyzed by the addition of water to the reaction mixture to form a solution containing free ethane-1-hydroxy-1,1-diphosphonic acid and acetic acid. Following the hydrolysis reaction, the hydrolyzed reaction product contains the desired ethane-1-hydroxy-1,1-diphosphonic acid.

Separation and recovery of the ethane-1-hydroxy-1,1-diphosphonic acid can be in any manner. If the hydrolysis is performed so that the hydrolyzed material contains only a small amount of water, e.g., 1% or less, the mixture can be cooled to a temperature in the range of 10° C. to 50° C., typically about 30° C., while being gently stirred. The ethane-1-hydroxy-1,1-diphosphonic acid begins to crystallize as the hydrolyzed mixture cools. At about 30° C., crystal formation requires about 1 to 2 hours. Seeding of the mixture can be used to shorten the time necessary for crystallization. The crystallized acid can then be recovered by filtration and neutralized by reaction with a suitable base, such as sodium hydroxide, to form the salt of ethane-1-hydroxy-1,1-diphosphonic acid. The procedure described by Whyte et al., supra, is suitable for the production of ethane-1-hydroxy-1,1-diphosphonic acid or its salts from the phosphorus trioxide prepared in the process of this invention.

Ethane-1-hydroxy-1,1-diphosphonic acid or its salts are valuable as a detergency builder for use in detergent compositions as described hereinbefore by Francis L. Diehl, supra.

The following examples are illustrative of the present invention and they are not intended in any way to limit the full scope of the invention as described herein.

Example I

Apparatus.—The apparatus used comprised a reaction zone, equipment for generating electromagnetic energy in the microwave range, and a phosphorus trioxide separation and recovery system.

The reaction zone comprised a 25 mm. O.D. vertically oriented quartz tube, 14 inches in length, tapered at the bottom to a cone at which point a helium gas inlet tube (1.5 mm. capillary) was attached. The cone angle and helium flow rate were such that a spouting bed of 4 to 6 ccs. in volume was formed, when finely divided $P_4O_{10}$ was placed in the cone and helium was passed into the reaction zone through the finely divided $P_4O_{10}$. Thus, helium passing through the gas inlet tube and into the reaction zone formed a fluidized bed of solid particles of $P_4O_{10}$ within the reaction zone. The helium plasma stream was formed in the reaction zone above the bed of $P_4O_{10}$. Passage of the helium through the solid $P_4O_{10}$ caused circulation of particles of $P_4O_{10}$ into the plasma region.

The equipment for generation of electromagnetic energy in the microwave range comprised a magnetron (Litton L-3460) powered by a Litton Model 218 power source. The magnetron was tunable in frequency in the microwave range of from 2350 to 3575 megahertz and the power source could be controlled from less than 100 watts to greater than 1500 watts. The microwave energy generated by the magnetron was conducted through waveguides to a microwave cavity surrounding the reaction zone. The reaction zone was air cooled to control the temperature within the range of 30° C. to 50° C.

The phosphorus trioxide separation and recovery system comprised a gas exit tube from the reaction zone connected to a spherical filter chamber 3 inches in diameter filled with glass wool for removal of any solid material, to a series of cold traps, cooled with a solid carbon dioxide slurry for condensation and collection of the phosphorus trioxide product, and to a vacuum pump for control of the pressure in the system and for removal of the oxygen formed in the formation of the phosphorus trioxide. The vacuum pump used to control the pressure within the system and to exhaust the entire reaction system was a Cenco Hi-vac 28 vacuum pump with a pumping speed of about 220 liters per minute at 1.0 torr (1 torr equals 1 mm. Hg).

Analysis of the products produced in the reaction zone was performed idometrically by the method of Jones and Swift, Anal. Chem., 25, 1272-4 (1953).

Preparation of $P_4O_6$.—The reaction zone was charged with 16.8 millimoles of solid $P_4O_{10}$ under a helium atmosphere purge. The entire system was then purged with helium and sealed. Evacuation of the system was begun slowly to prevent transfer of $P_4O_{10}$ dust from the reaction zone into the glass wool filter. Upon evacuation to a pressure of 1 torr, mechanical vibration of the bed was started by passing helium through the bed of $P_4O_{10}$. As soon as the fluidized bed had stabilized, the magnetron was turned on to a frequency of 2450 megahertz at a power of 700–900 watts. The helium plasma flame was then ignited with the aid of a Tesla coil. The plasma was operated for 30 minutes and 1.50 millimoles (8.9% yield adjusted for the amount of phosphorus pentoxide recovered) of phosphorus trioxide was formed in essentially pure form.

Example II

Preparation of $P_4O_6$.—The procedure of Example I was repeated except that 84.6 millimoles of phosphorus pentoxide was charged into the reaction zone. The plasma was allowed to run for 25 minutes and 3.98 millimoles (4.7% yield adjusted for the amount of phosphorus pentoxide recovered) of phosphorus trioxide was obtained in essentially pure form.

Example III

Preparation of $P_4O_6$.—The apparatus comprised a reaction zone, equipment for generating electromagnetic energy in the microwave range, a phosphorus pentoxide vaporizer and a phosphorus trioxide separation and recovery system.

The reaction zone comprised a vertically oriented quartz tube 14 inches long and 13 mm. in outside diameter. The center third of the tube was expanded to provide an oval cavity 35 mm. in outside diameter and 5 inches in length. A phosphorus pentoxide vaporizer was connected to the oval cavity via a side arm attachment. The bottom of the reaction zone was tapered to form a gas inlet tube. The gas inlet tube was connected to a source of helium. The top of the reaction zone was connected to the phosphorus trioxide separation and recovery system.

The equipment for generation of electromagnetic energy in the microwave range comprised a magnetron (Litton L-3460) powered by a Litton Model 218 power source. The magnetron was tunable in frequency in the microwave range of from 2350 to 3575 megahertz and the power source could be controlled from less than 100 watts to greater than 1500 watts. The microwave energy generated by the magnetron was conducted through a coaxial cable to a microwave cavity surrounding the gas inlet tube to the reaction zone.

The phosphorus pentoxide vaporizer comprised a glass tube wrapped with a resistance wire for heating the vaporizer electrically to about 250° C. to 270° C. and connected to a source of helium for sweeping the phosphorus pentoxide vapor into the reaction zone.

The phosphorus trioxide separation and recovery system comprised a gas exit tube from the top of the reaction zone connected to a spherical filter chamber 3 inches in diameter filled with glass wool for removal of any solid material, to a series of cold traps, cooled with a solid carbon dioxide slurry, for condensation and collection of the phosphorus trioxide product, and to a vacuum pump for control of the pressure in the system and for removal of the oxygen formed in the formation of the phosphorus trioxide. The vacuum pump used to control the pressure within the system and to exhaust the entire reaction system was a Cenco Hi-Vac 28 vacuum pump with a pumping speed of about 220 liters per minute at 1.0 torr (1 torr equals 1 mm. Hg).

Analysis of the products produced in the reaction zone was performed iodometrically by the method of Jones and Swift, Anal. Chem., 25, 1272-4 (1953).

Solid $P_4O_{10}$ was placed in the phosphorus pentoxide vaporizer. Helium, as a carrier gas, was passed through the phosphorus pentoxide vaporizer, the reaction zone and the phosphorus trioxide separation and recovery system to purge the system. Once the system was purged, the $P_4O_{10}$ vaporizer was heated to a temperature of about 250–275° C. and helium to form the plasma flame was introduced into the reaction zone via the gas inlet tube at the bottom of the reaction zone. The $P_4O_{10}$ vapor entrained in the helium carrier gas was then swept through the reaction zone. The helium plasma flame was initiated through the use of a Tesla coil and simultaneously microwave energy of 2450 megahertz at a power of 150 watts from the magnetron was passed through the coaxial cable and into the microwave cavity surrounding the gas inlet tube. The reaction zone at a temperature of 30° C. to 50° C. was operated for a period of 150 minutes with a total of 461 millimoles of helium being passed. During this time 27.92 millimoles of $P_4O_{10}$ (based on the difference between the amount of $P_4O_{10}$ charged in the $P_4O_{10}$ vaporizer and that remaining in the $P_4O_{10}$ vaporizer at the end of 150 minutes and the amount of $P_4O_{10}$ recovered) resulted in a formation of 4.21 millimoles of phosphorus trioxide (15.1% yield) in essentially pure form.

When in Example II above the phosphorus pentoxide in the phosphorus pentoxide vaporizer is replaced by elemental phosphorus and phosphorus pentoxide vapor is mixed with the plasma-forming gas substantially similar results are obtained in that phosphorus trioxide is prepared.

I claim:

1. A process for preparing an anhydride of trivalent phosphorus comprising subjecting an anhydride of pentavalent phosphorus to a plasma stream of electronically-excited helium in a reaction zone, said plasma stream being characterized as a stream of helium irradiated with electromagnetic energy having a frequency of from 300 megahertz to 100,000 megahertz.

2. The process of claim 1 wherein the reaction zone has a temperature of from 0° C. to 500° C.

3. The process of claim 2 wherein the frequency is from 1000 megahertz to 5000 megahertz.

4. The process of claim 3 wherein the anhydride of pentavalent phosphorus is a vapor and wherein the reaction zone has a temperature of from 0° C. to 100° C.

5. The process of claim 4 wherein the reaction zone is operated at a pressure of from 0.001 atmosphere to 0.1 atmosphere.

6. The process of claim 5 wherein the stream of helium has a flow rate of from 0.5 to 10 millimoles per minute per square foot of reaction zone cross sectional area.

7. The process of claim 5 wherein the reaction zone contains a fluidized bed of finely divided anhydride of pentavalent phosphorus.

8. The process of claim 5 wherein the anhydride of pentavalent phosphorus is a vapor and wherein the reaction zone contains an oxygen acceptor selected from the group consisting of hot copper, carbon and phosphorus.

9. The process of claim 7 wherein the oxygen acceptor is phosphorus.

10. A process for preparing an anhydride of trivalent phosphorus comprising:
 (1) forming a plasma stream of electronically-excited helium in a reaction zone, said plasma stream being characterized as a stream of helium irradiated with electromagnetic energy having a frequency of from 300 megahertz to 100,000 megahertz;
 (2) subjecting an anhydride of pentavalent phosphorus to the plasma stream of electronically-excited helium to form an anhydride of trivalent phosphorus and oxygen; and
 (3) separating the anhydride of trivalent phosphorus.

11. The process of claim 10 wherein the reaction zone has a temperature of from 0° C. to 500° C. and wherein the frequency is from 1000 megahertz to 5000 megahertz.

12. The process of claim 11 wherein the reaction zone has a temperature of from 0° C. to 100° C.

13. The process of claim 12 wherein the reaction zone is at a pressure of from 0.001 atmosphere to 0.1 atmosphere and wherein the stream of helium has a flow rate of from 0.5 to 10 millimoles per minute per square foot of reaction zone cross sectional area.

14. The process of claim 13 wherein the anhydride of pentavalent phosphorus is a vapor and wherein the anhydride of trivalent phosphorus is separated using an oxygen acceptor selected from the group consisting of hot copper, carbon and phosphorus.

15. The process of claim 14 wherein the oxygen acceptor is phosphorus.

References Cited
UNITED STATES PATENTS

| | | | |
|---|---|---|---|
| 2,500,008 | 3/1960 | Richardson | 204—157.1 S |
| 3,346,472 | 10/1967 | Long | 204—157.1 S |
| 3,304,249 | 2/1967 | Katz | 204—164 |
| 3,532,461 | 10/1970 | Whyte et al. | 23—165 |

FREDERICK C. EDMUNDSON, Primary Examiner

U.S. Cl. X.R.

23—165; 204—164